(12) United States Patent
Lee et al.

(10) Patent No.: US 12,176,550 B2
(45) Date of Patent: *Dec. 24, 2024

(54) RECHARGEABLE BATTERY

(71) Applicant: Samsung SDI Co., Ltd., Yongin-si (KR)

(72) Inventors: Jong-Ha Lee, Yongin-si (KR); Byoungmin Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 141 days.

This patent is subject to a terminal disclaimer.

(21) Appl. No.: 17/963,867

(22) Filed: Oct. 11, 2022

(65) Prior Publication Data

US 2023/0038569 A1 Feb. 9, 2023

Related U.S. Application Data

(63) Continuation of application No. 17/031,710, filed on Sep. 24, 2020, now Pat. No. 11,515,595.

(30) Foreign Application Priority Data

Feb. 3, 2020 (KR) ........................ 10-2020-0012597

(51) Int. Cl.
*H01M 50/152* (2021.01)
*H01M 10/04* (2006.01)
(Continued)

(52) U.S. Cl.
CPC ..... *H01M 50/152* (2021.01); *H01M 10/0427* (2013.01); *H01M 10/0587* (2013.01);
(Continued)

(58) Field of Classification Search
None
See application file for complete search history.

(56) References Cited

U.S. PATENT DOCUMENTS

| | | |
|---|---|---|
| 2,866,841 A | 12/1958 | Zahn |
| 11,515,595 B2 | 11/2022 | Lee et al. |

(Continued)

FOREIGN PATENT DOCUMENTS

| | | |
|---|---|---|
| CN | 104332647 A | 2/2015 |
| CN | 105789674 A | 7/2016 |

(Continued)

OTHER PUBLICATIONS

Korean Office action issued in corresponding application No. KR 10-2020-0012597, dated Jun. 28, 2022, 5 pages.

(Continued)

*Primary Examiner* — Anca Eoff
(74) *Attorney, Agent, or Firm* — Lewis Roca Rothgerber Christie LLP

(57) ABSTRACT

A rechargeable battery includes: an electrode assembly including a first electrode, a second electrode, a separator between the first and second electrodes, and first and second electrode tabs respectively coupled to the first and second electrodes; a case accommodating the electrode assembly and coupled to the first electrode tab; and a cap assembly sealing an opening in the case. The cap assembly includes: a cap plate covering the opening in the case; and a terminal plate coupled to the cap plate. The terminal plate includes: a flange portion coupled to and electrically insulated from the cap plate; and a tab connecting portion protruding from the flange portion toward the electrode assembly and extending through a terminal opening in the cap plate to be coupled to the second electrode tab. The terminal plate has a flat outer surface, and the tab connecting portion has a flat inner surface.

20 Claims, 3 Drawing Sheets

(51) Int. Cl.
  *H01M 10/0587* (2010.01)
  *H01M 50/109* (2021.01)
  *H01M 50/147* (2021.01)
  *H01M 50/153* (2021.01)
  *H01M 50/172* (2021.01)
  *H01M 50/538* (2021.01)
  *H01M 50/543* (2021.01)

(52) U.S. Cl.
  CPC ....... *H01M 50/109* (2021.01); *H01M 50/147* (2021.01); *H01M 50/153* (2021.01); *H01M 50/172* (2021.01); *H01M 50/538* (2021.01); *H01M 50/543* (2021.01); *H01M 2220/30* (2013.01)

(56) References Cited

U.S. PATENT DOCUMENTS

| | | |
|---|---|---|
| 2005/0118499 A1 | 6/2005 | Kim |
| 2006/0051666 A1 | 3/2006 | Kim |
| 2006/0204842 A1 | 9/2006 | Cho et al. |
| 2016/0043356 A1 | 2/2016 | Sunada et al. |
| 2016/0204411 A1 | 7/2016 | Lee et al. |
| 2017/0207491 A1 | 7/2017 | Tamachi et al. |
| 2022/0166050 A1* | 5/2022 | Park .................. H01M 10/0422 |
| 2023/0038569 A1 | 2/2023 | Lee et al. |

FOREIGN PATENT DOCUMENTS

| | | |
|---|---|---|
| JP | 2016-038991 A | 3/2016 |
| JP | 2017-130435 A | 7/2017 |
| KR | 10-2017-0063134 A | 6/2017 |
| WO | WO 2019/113970 A1 | 6/2019 |

OTHER PUBLICATIONS

Extended European Search Report issued in corresponding application EP 20212894.8, dated May 17, 2021, 8 pages.

Chinese Notice of Allowance, with English translation, dated Mar. 4, 2024, issued in Chinese Patent Application No. 202011319924.X (6 pages).

US Notice of Allowance dated Mar. 6, 2024, issued in U.S. Appl. No. 17/963,839 (9 pages).

Machine translation of CN 104332647 A, published on Feb. 4, 2016 (Year: 2015).

US Office Action dated Nov. 24, 2023, issued in U.S. Appl. No. 17/963,839 (16 pages).

* cited by examiner

RECHARGEABLE BATTERY

CROSS-REFERENCE TO RELATED APPLICATION

This application is a continuation of U.S. patent application Ser. No. 17/031,710, filed Sep. 24, 2020, which claims priority to and the benefit of Korean Patent Application No. 10-2020-0012597, filed in the Korean Intellectual Property Office on Feb. 3, 2020, the entire content of all of which is incorporated herein by reference.

BACKGROUND

1. Field

Aspects of embodiments of the present disclosure relate to a rechargeable battery.

2. Description of the Related Art

A rechargeable battery differs from a primary battery in that it is designed to be repeatedly charged and discharged, while the latter is not designed to be recharged. A low-capacity rechargeable battery may be used in a portable electronic device, such as a mobile phone, a laptop computer, and a camcorder, and a large-capacity rechargeable battery may be used as a power source for driving a motor of a hybrid vehicle and the like.

Some examples of a rechargeable battery include a nickel-cadmium (Ni—Cd) battery, a nickel-metal hydride (Ni-MH) battery, a lithium (Li) battery, a lithium ion (Li-ion) rechargeable battery, etc. The Li-ion rechargeable battery has an operating voltage that is about three times higher than the Ni—Cd battery and the Ni-MH battery and is widely used as a power supply of portable electronic devices. In addition, the lithium ion rechargeable battery has been widely used because its relatively high energy density per unit weight.

As demand for wearable devices, such as a headphone, an earphone, a smart watch, and a body-worn medical device using Bluetooth has increased, a need for a rechargeable battery having a relatively high energy density and an ultra-compact size has been increasing.

An ultra-compact rechargeable battery should have a secure electrical capacity within a limited size, implement an efficient structure while reducing weight, and have sufficient structural stability.

The above information disclosed in this Background section is for enhancement of understanding of the background of the present disclosure, and therefore, it may contain information that does not form the prior art that is already known to a person of ordinary skill in the art.

SUMMARY

According to embodiments of the present disclosure, a rechargeable battery is provided in which both an outer surface and an inner surface of a terminal plate are flat.

According to embodiments of the present disclosure, a rechargeable battery is provided that may structurally prevent (or substantially prevent) a short circuit of an electrode tab connected to a terminal plate from a cap plate having a different polarity than the electrode tab.

According to embodiments of the present disclosure, a rechargeable battery is provided that may improve positional freedom of a pin when connecting an external pin (e.g., a connecting member) to a terminal plate of the rechargeable battery.

An embodiment of the present disclosure provides a rechargeable battery including: an electrode assembly including a first electrode, a second electrode, a separator between the first electrode and the second electrode, a first electrode tab coupled to the first electrode, and a second electrode tab coupled to the second electrode; a case accommodating the electrode assembly and coupled to the first electrode tab; and a cap assembly sealing an opening in the case. The cap assembly includes: a cap plate coupled to the case and covering the opening in the case; and a terminal plate coupled to the cap plate. The terminal plate includes: a flange portion coupled to and electrically insulated from the cap plate; and a tab connecting portion protruding from the flange portion toward the electrode assembly and extending through a terminal opening in the cap plate. The tab connecting portion is coupled to the second electrode tab. Outer surfaces of the flange portion and the tab connecting portion form a flat outer surface of the terminal plate, and the tab connecting portion has a flat inner surface that protrudes into the case.

The flange portion of the terminal plate may be parallel to the cap plate.

A first end of the electrode assembly may face the case, a second end of the electrode assembly may face the cap plate, and a height different may be formed between the inner surface of the tab connecting portion and an inner surface of the cap plate.

The inner surface of the tab connecting portion may be nearer to the second end of the electrode assembly than the inner surface of the cap plate is.

When the second end of the electrode assembly is a flat reference surface: a first height may be formed between the inner surface of the cap plate and the second end of the electrode assembly; a second height may be formed between the inner surface of the tab connecting portion and the second end of the electrode assembly; and the second height may be smaller than the first height.

A distal portion of the inner surface of the tab connecting portion that faces the second electrode tab may be nearer to the second end of the electrode assembly than the inner surface of the cap plate is.

When the second end of the electrode assembly is a flat reference surface: a first height may be formed between the inner surface of the cap plate and the second end of the electrode assembly; a second height may be formed between a distal portion of the inner surface of the tab connecting portion that faces the second electrode tab and the second end of the electrode assembly; and the second height may be smaller than the first height.

The terminal plate may include forged aluminum.

The rechargeable battery may further include an insulating member between the cap plate and the second electrode tab.

The insulating member may have a plate shape with a through opening therein, and the through opening in the insulating member may correspond to the terminal opening in the cap plate.

The through opening in the insulating member may have a smaller diameter than the terminal opening in the cap plate, and the through opening in the insulating member and the terminal opening in the cap plate may be concentric.

When the opening in the case is sealed and closed by the cap assembly, a height may be a distance between the case and the outer surface of the terminal plate, a diameter may be an outer diameter of the case, and a height-to-diameter ratio may be 1 or less.

The electrode assembly may be formed by winding the first electrode, the second electrode, and the separator interposed between the first electrode and the second electrode into a jelly roll shape.

As described above, according to embodiments of the present disclosure, the terminal plate includes a flange portion and a tab connecting portion that together form a planar outer surface, and the tab connecting portion protrudes into the case with a planar inner surface in the case. Thus, when connecting an external pin (e.g., a connecting member) to the terminal plate, the positional freedom of the pin is improved.

Further, because a height difference is formed between the inner surface of the tab connecting portion and the inner surface of the cap plate, a short circuit between a second electrode tab connected to the tab connecting portion of the terminal plate and the cap plate, which is connected to a first electrode and has a different polarity that the second electrode tab, may be prevented or substantially prevented.

DETAILED DESCRIPTION

Figure 1:
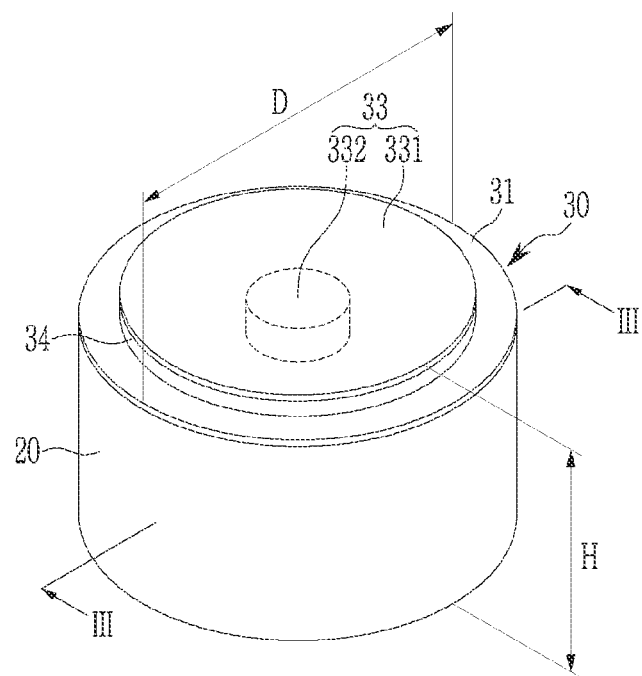
FIG. 1 is a perspective view of a rechargeable battery according to an embodiment of the present disclosure.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure. Accordingly, the drawings and description are to be regarded as illustrative in nature and not restrictive.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present invention relates to "one or more embodiments of the present invention." As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

A rechargeable battery according to an embodiment of the present disclosure is an ultra-compact battery and may be a coin cell or a button cell. The coin cell or the button cell is a thin coin-type or button-type cell and generally describes a battery having a ratio (H/D) of a height (H) to a diameter (D) (e.g., a height-to-diameter ratio) of 1 or less (see, e.g., FIG. 1).

Because the coin cell or the button cell is generally cylindrical, a horizontal cross-section is circular. The present disclosure, however, is not limited thereto, and a horizontal cross-section of the rechargeable battery may be oval or polygonal. A diameter may be a maximum diameter (or width) of a case based on a horizontal direction of the battery, and a height may be a maximum distance between the case of the battery (e.g., a bottom surface of the case) and an outer plane of a cap plate.

However, the present disclosure is not limited to the coin cell or the button cell, and these are merely example embodiments of the present disclosure. A battery, according to embodiments of the present disclosure, may be a cylindrical-type or pin-type battery. Hereinafter, an embodiment in which the rechargeable battery is a coin cell or a button cell will be described in detail as an example.

Figure 2:
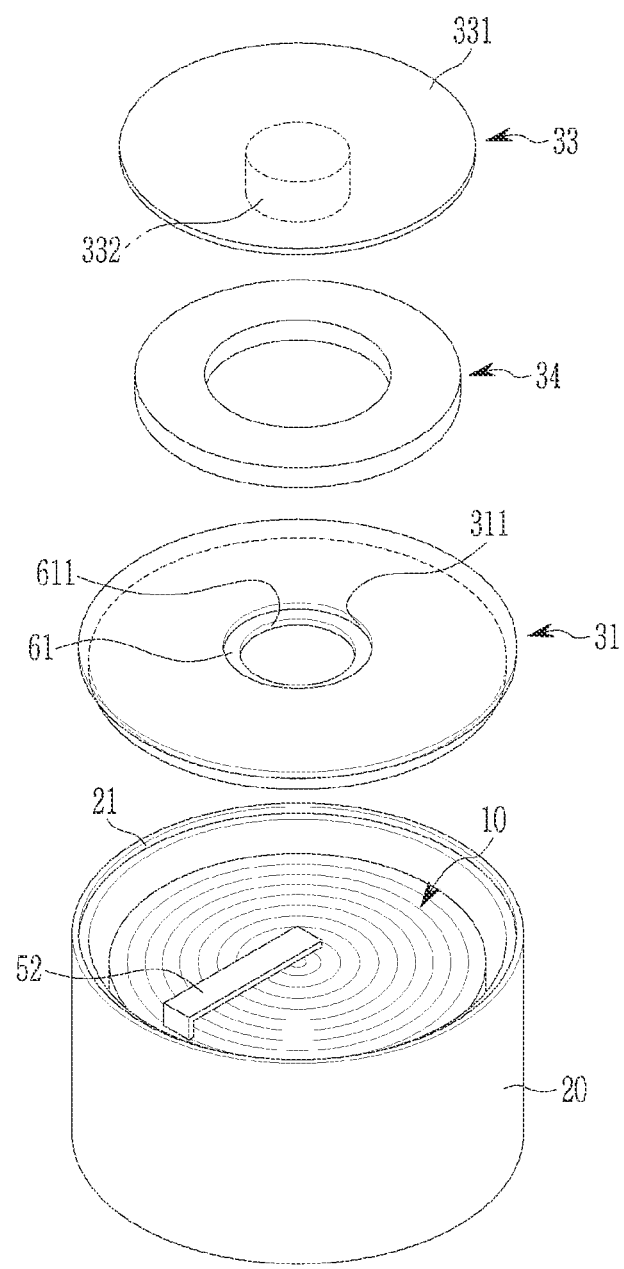
FIG. 2 is an exploded perspective view of the rechargeable battery shown in FIG. 1.
Figure 3:
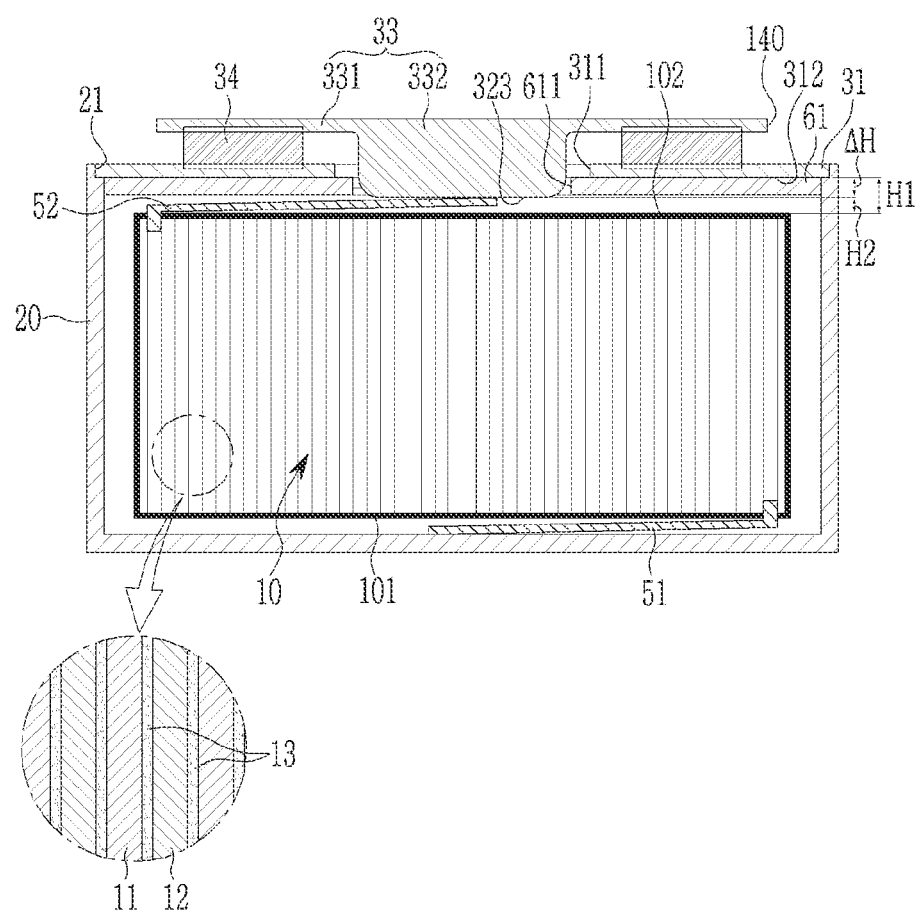
FIG. 3 is a cross-sectional view taken along the line III-Ill of FIG. 1.

FIG. 1 is a perspective view of a rechargeable battery according to an embodiment of the present disclosure, FIG. 2 is an exploded perspective view of the rechargeable battery shown in FIG. 1, and FIG. 3 is a cross-sectional view taken along the line III-Ill of FIG. 1.

Referring to FIGS. 1 to 3, a rechargeable battery according to an embodiment includes an electrode assembly 10, a case 20, and a cap assembly 30. The cap assembly 30 includes a cap plate 31 and a terminal plate 33. The cap plate 31 and the terminal plate 33 are heat-fused to each other by a heat-fusion member 34 disposed therebetween.

The heat-fusion member 34 is a medium for mutually coupling the cap plate 31 and the terminal plate 33. For example, the heat-fusion member 34 may include (or may be made of) an electrically insulating material, such as a polymer, and may be melted by using a laser or the like to be fused to the cap plate 31 and the terminal plate 33.

By coupling the terminal plate 33 to the cap plate 31 through the heat-fusion member 34, as shown in the illustrated embodiment, a stable coupling structure is formed while the terminal plate 33 and the cap plate 31 are effectively insulated from each other without using a separate insulating member.

Because a coin cell is manufactured in an ultra-compact size, it may have a design limitation in terms of space, and accordingly, it is desirable to secure functionality while simplifying a structure and a manufacturing process thereof. In this vein, in the illustrated embodiment, insulation and coupling between the terminal plate 33 and the cap plate 31 through the heat-fusion member 34 are realized.

The electrode assembly 10 includes a first electrode 11 (e.g., a negative electrode) and a second electrode 12 (e.g., a positive electrode) provided at respective sides of a separator 13, which is (e.g., which includes or which is formed of) an electrical insulating material. The electrode assembly 10 is formed by winding the first electrode 11, the separator 13, and the second electrode 12. Therefore, the electrode assembly 10 may be formed as a jelly roll type.

The electrode assembly 10 is configured to charge and discharge a current, and a winding shaft (e.g., a winding axis) may be arranged in the electrode assembly 10 parallel to a height direction of the case 20. A first end (e.g., a lower surface) 101 and a second end (e.g., an upper surface) 102 of the electrode assembly 10 may be flat and parallel to each other. In the illustrated embodiment, the electrode assembly 10 does not include a center pin, but a center pin may be provided along the winding shaft (e.g., at a center of the electrode assembly 10 parallel to the winding axis).

The case 20 accommodates the electrode assembly 10 while facing the first end 101 from among both ends 101, 102 of the electrode assembly 10. As an example, the case 20 has a cylindrical shape that accommodates the jelly roll type electrode assembly 10, and the cap assembly 30 seals an opening 21 in the cylindrical case 20.

The electrode assembly 10 includes a first electrode tab 51 connected to the first electrode 11 and a second electrode tab 52 connected to the second electrode 12, and the first and second electrodes 11 and 12 are drawn out to the first and second ends 101 and 102 of the electrode assembly 10, respectively.

When the electrode assembly 10 is accommodated in the case 20, the first electrode tab 51 is electrically connected to a bottom of the case 20, and the second electrode tab 52 is electrically connected to the terminal plate 33 of the cap assembly 30.

In addition, the cap plate 31 of the cap assembly 30, while facing the second end 102 from among both ends 101, 102 of the electrode assembly 10, is coupled to the case 20 to cover the opening 21. The terminal plate 33 is coupled to the second electrode tab 52 while being coupled to the cap plate 31.

Hereinafter, an embodiment in which the first electrode 11 and the second electrode 12 are a negative electrode and a positive electrode, respectively, will be exemplarily described, but the present disclosure is not limited thereto. In other embodiments, the first electrode 11 and the second electrode 12 may be the positive electrode and the negative electrode, respectively.

The first electrode (e.g., the negative electrode) 11 is formed in a long extending strip shape and has a negative electrode coated portion, which is a region in which a negative electrode active material layer is coated to a current collector (e.g., a metal foil, such as a Cu foil, current collector), and a negative electrode uncoated portion, which is a region in which an active material is not coated. The negative electrode uncoated portion may be disposed at one end portion in a length direction of the negative electrode.

The second electrode (e.g., the positive electrode) 12 is formed in a long extending strip shape and has a positive electrode coated portion, which is a region in which a positive electrode active material layer is coated to a current collector (e.g., a metal foil, such as an Al foil, current collector), and a positive electrode uncoated portion, which is a region in which an active material is not coated. The positive electrode uncoated portion may be disposed at one end portion in a length direction of the positive electrode.

The electrode assembly 10 may be inserted into the case 20 through the opening 21, which is formed at one side of the case 20, and the case 20 has a space (e.g., has sufficient space) for accommodating the electrode assembly 10 and an electrolyte therein. For example, the case 20 has a cylindrical shape having a height H that is smaller than a diameter D thereof and has a circular opening 21 so that the cylindrical electrode assembly 10 may be inserted into an inner space of the case 20.

The terminal plate 33 of the cap assembly 30 includes a flange portion 331 and a tab connecting portion 332. The flange portion 331 and the tab connecting portion 332 form (e.g., together form) a flat outer surface on the case 20. The tab connecting portion 332 protrudes into the case 20 and has a flat inner surface. The flange portion 331 is formed parallel to the cap plate 31.

Because the terminal plate 33 has a flat outer surface and the inner surface of the tab connecting portion 332 is flat, when an external pin (e.g., a connecting member) is connected to the terminal plate 33 of the rechargeable battery, the positional freedom of the pin (e.g., the connecting member) may be improved.

The flange portion 331 is coupled to the cap plate 31 in an electrically insulating state (e.g., the flange portion 331 is coupled to and electrically insulated from the cap plate 31). The tab connecting portion 332 protrudes from the flange portion 331 toward the electrode assembly 10 and is inserted into a terminal opening (e.g., a terminal hole) 311 to be connected to the second electrode tab 52 of the electrode assembly 10.

In the illustrated embodiment, the inner surface 323 of the tab connecting portion 332 has a height difference ΔH from the inner surface 312 of the cap plate 31. Thus, when the second electrode tab 52, which has positive polarity, is extended with a length margin between the second end 102 of the electrode assembly 10 and the inner surface 312 of the cap plate 31, the height difference ΔH provides a safety range (or safety margin) to prevent (or substantially prevent)

a short circuit between the second electrode tab 52, which has positive polarity, the cap plate 31, which has negative polarity.

For example, a short circuit between the second electrode tab 52, which has positive polarity and is connected to the terminal plate 33, and the cap plate 31, which has negative polarity and is connected to the first electrode tab 51, may be structurally prevented (or substantially prevented) by the height difference ΔH.

For example, the inner surface 323 of the tab connecting portion 332 protrudes farther toward the second end 102 of the electrode assembly 10 than the inner surface 312 of the cap plate 31 does, and the inner surface 323 of the tab connecting portion 332 has a flat surface. When the second end 102 of the electrode assembly 10 is a flat reference surface, a first height H1 is formed between the inner surface 312 of the cap plate 31 and the second end 102 of the electrode assembly 10.

Further, a second height H2 is formed between the flat inner surface 323 of the tab connecting portion 332 and the second end 102 of the electrode assembly 10. Because the second end 102 of the electrode assembly 10 is used as the flat reference surface to measure both the first height H1 and the second height H2, the second height H2 is smaller than the first height H1. For example, the height difference ΔH between the first height H1 and the second height H2 may structurally prevent (or substantially prevent) a short circuit between the second electrode tab 52 and the cap plate 31.

An insulating member 61 is interposed between the cap plate 31 and the second electrode tab 52. In the illustrated embodiment, the insulating member 61 has a plate shape corresponding to the cap plate 31, but the present disclosure is not limited thereto as long as the insulating member 61 is interposed between the cap plate 31 and the second electrode tab 52.

The insulating member 61 has a through opening (e.g., a through hole) 611 corresponding to the terminal opening 311. The through opening 611 may have a smaller diameter than that of the concentric terminal opening 311. Therefore, the second electrode tab 52 is further prevented from shorting to the cap plate 31 through the terminal opening 311.

In addition, an outer (or distal) portion of the inner surface 323 of the tab connecting portion 332 facing at least the second electrode tab 52 is formed to protrude father toward the second end 102 of the electrode assembly 10 than the inner surface 312 of the cap plate 31 does. Thus, when the second end 102 of the electrode assembly 10 is the flat reference surface, the first height H1 is formed between the inner surface 312 of the cap plate 31 and the second end 102 of the electrode assembly 10.

The second height H2 is formed between the outer portion of the inner surface 323 of the tab connecting portion 332 facing at least the second electrode tab 52 and the second end 102 of the electrode assembly 10. Because the second end 102 of the electrode assembly 10 is the flat reference surface to measure both the first height H1 and the second height H2, the second height H2 is smaller than the first height H1. For example, the height difference ΔH between the first height H1 and the second height H2 may structurally prevent (or substantially prevent) a short circuit between the second electrode tab 52 and the cap plate 31.

The terminal plate 33 may be formed of forged aluminum. The flange portion 331 of the terminal plate 33 is formed to be parallel to the cap plate 31, the tab connecting portion 332 of the terminal plate 33 protrudes into the case 20, and the inner surface 323 of the tab connecting portion 332 is flat. Thus, the weldability of the inner surface 323 of the tab connecting portion 332 and the second electrode tab 52 may be improved.

Different from stainless steel, aluminum may be forged, and forging is an appropriate processing method that may form the outer surfaces of the flange portion 331 and the tab connecting portion 332 of the terminal plate 33 to be flat and may form the inner surface 323 of the tab connecting portion 332 of the terminal plate 33 to be flat.

In the illustrated embodiment, the entire inner surface 323, which includes the outer portion facing the second electrode tab 52, of the terminal plate 33 may be flat, but in other embodiments, only a portion of the inner surface 323 facing the second electrode tab 52 may be formed flat.

For example, only the outer portion in a diameter direction from among portions of the inner surface 323 of the tab connecting portion 332 facing at least the second electrode tab 52 may be formed to further protrude toward the second end 102 of the electrode assembly 10 than the inner surface 312 of the cap plate 31 does.

In the rechargeable battery according to the illustrated embodiment, when the opening 21 in the case 20 is sealed by the cap assembly 30, the height H is a distance (e.g., a maximum distance) between the outer surfaces of the case 20 and the terminal plate 33, and the diameter D is an outer diameter (e.g., a maximum diameter) of the case 20. In this embodiment, a ratio of the height H to the diameter D is 1 or less (H/D≤1). Therefore, the rechargeable battery may have a thin coin or button shape, thus, may be considered a coin cell or a button cell.

While the present disclosure has been described in connection with what is presently considered to be practical embodiments, it is to be understood that the present disclosure is not limited to the disclosed embodiments but, on the contrary, is intended to cover various modifications and equivalent arrangements included within the spirit and scope of the appended claims and their equivalents.

<Description of Some Reference Symbols>

| | |
|---|---|
| 10: electrode assembly | 11, 12: first and second electrodes |
| 13: separator | 20: case |
| 21: opening | 30: cap assembly |
| 31: cap plate | 33: terminal plate |
| 51: first electrode tab | 52: second electrode tab |
| 61: insulating member | 101: first end |
| 102: second end | 323: inner surface |
| 311: terminal opening | 312: inner surface |
| 331: flange portion | 332: tab connecting portion |
| 611: through opening | D: diameter |
| H: height | H1: first height |
| H2: second height | ΔH: height difference |

What is claimed is:

1. A button cell comprising:
   an electrode assembly comprising a first electrode, a second electrode, a separator between the first electrode and the second electrode, a first electrode tab coupled to the first electrode, and a second electrode tab coupled to the second electrode;
   a case accommodating the electrode assembly and coupled to the first electrode tab; and
   a cap assembly sealing an opening in the case, the cap assembly comprising:
   a cap plate coupled to the case and covering the opening in the case;
   a terminal plate coupled to the cap plate; and a heat fusion member between the cap plate and the terminal plate, wherein the terminal plate comprises:
- a flange portion coupled to and electrically insulated from the cap plate by the heat fusion member arranged therebetween; and
- a tab connecting portion protruding from the flange portion toward the electrode assembly and extending through a terminal opening in the cap plate, the tab connecting portion being coupled to the second electrode tab, and wherein an outer edge of the flange portion is closer to an outer edge of the cap plate than an outer edge of the heat fusion member in a horizontal direction of the button cell.

2. The button cell of claim 1, wherein outer surfaces of the flange portion and the tab connecting portion form a flat outer surface of the terminal plate, and
wherein the tab connecting portion has a flat inner surface that protrudes into the case.

3. The button cell of claim 2, wherein the flange portion of the terminal plate is parallel to the cap plate.

4. The button cell of claim 2, wherein a first end of the electrode assembly faces the case, and a second end of the electrode assembly faces the cap plate, and
wherein a height difference is formed between the flat inner surface of the tab connecting portion and an inner surface of the cap plate.

5. The button cell of claim 4, wherein the flat inner surface of the tab connecting portion is nearer to the second end of the electrode assembly than the inner surface of the cap plate is.

6. The button cell of claim 4, wherein, when the second end of the electrode assembly is a flat reference surface;
- a first height is formed between the inner surface of the cap plate and the second end of the electrode assembly;
- a second height is formed between the flat inner surface of the tab connecting portion and the second end of the electrode assembly; and
- the second height is smaller than the first height.

7. The button cell of claim 4, wherein a distal portion of the flat inner surface of the tab connecting portion that faces the second electrode tab is nearer to the second end of the electrode assembly than the inner surface of the cap plate is.

8. The button cell of claim 4, wherein, when the second end of the electrode assembly is a flat reference surface;
- a first height is formed between the inner surface of the cap plate and the second end of the electrode assembly;
- a second height is formed between a distal portion of the flat inner surface of the tab connecting portion that faces the second electrode tab and the second end of the electrode assembly; and
- the second height is smaller than the first height.

9. The button cell of claim 1, wherein the terminal plate comprises forged aluminum.

10. The button cell of claim 1, further comprising an insulating member between the cap plate and the second electrode tab.

11. The button cell of claim 10, wherein an inner edge of the insulating member is closer to the tab connecting portion than an inner edge of the cap plate in the horizontal direction of the button cell.

12. The button cell of claim 10, wherein the insulating member has a plate shape with a through opening therein, and
wherein the through opening in the insulating member corresponds to the terminal opening in the cap plate.

13. The button cell of claim 12, wherein the through opening in the insulating member has a smaller diameter than the terminal opening in the cap plate, and
wherein the through opening in the insulating member and the terminal opening in the cap plate are concentric.

14. The button cell of claim 1, wherein, when the opening in the case is sealed and closed by the cap assembly, a height is a distance between the case and an outer surface of the terminal plate, a diameter is an outer diameter of the case, and a height-to-diameter ratio is 1 or less.

15. The button cell of claim 1, wherein the electrode assembly is formed by winding the first electrode, the second electrode, and the separator interposed between the first electrode and the second electrode into a jelly roll shape.

16. A button cell comprising:
- an electrode assembly comprising a first electrode, a second electrode, a separator between the first electrode and the second electrode, a first electrode tab coupled to the first electrode, and a second electrode tab coupled to the second electrode;
- a case accommodating the electrode assembly and coupled to the first electrode tab;
- a cap assembly sealing an opening in the case, the cap assembly comprising:
  - a cap plate coupled to the case and covering the opening in the case; and
  - a terminal plate coupled to the cap plate; and
- an insulating member between the cap plate and the second electrode tab, wherein the terminal plate comprises:
- a flange portion coupled to and electrically insulated from the cap plate; and
- a tab connecting portion protruding from the flange portion toward the electrode assembly and extending through a terminal opening in the cap plate, the tab connecting portion being coupled to the second electrode tab, wherein an inner edge of the insulating member is closer to the tab connecting portion than an inner edge of the cap plate in a horizontal direction of the button cell.

17. The button cell of claim 16, wherein the insulating member has a plate shape with a through opening therein, and
wherein the through opening in the insulating member corresponds to the terminal opening in the cap plate.

18. The button cell of claim 17, wherein the inner edge of the insulating member forms the through opening.

19. The button cell of claim 17, wherein the inner edge of the cap plate forms the terminal opening.

20. The button cell of claim 17, wherein the through opening in the insulating member has a smaller diameter than the terminal opening in the cap plate, and
wherein the through opening in the insulating member and the terminal opening in the cap plate are concentric.

* * * * *